(12) United States Patent
Kwak

(10) Patent No.: US 6,269,121 B1
(45) Date of Patent: Jul. 31, 2001

(54) ADAPTIVE MOTION ESTIMATION METHOD AND APPARATUS

(75) Inventor: Chang Min Kwak, Seoul (KR)

(73) Assignee: Daewoo Electronics Co., Ltd. (KR)

( * ) Notice: Subject to any disclaimer, the term of this patent is extended or adjusted under 35 U.S.C. 154(b) by 0 days.

(21) Appl. No.: 09/133,239

(22) Filed: Aug. 13, 1998

(30) Foreign Application Priority Data

Aug. 13, 1997 (KR) .................................. 97-38533

(51) Int. Cl.$^7$ .................................................. H04B 1/66
(52) U.S. Cl. ...................................... 375/240.16; 382/236
(58) Field of Search .................. 375/240.02, 240.16, 375/240.25, 240.21, 240.24, 240.15, 240.17; 348/402.1, 404.1, 407.1, 413.1, 416.1, 431.1, 420.1, 427.1, 405.1; 382/236, 232, 239, 107, 254

(56) References Cited

U.S. PATENT DOCUMENTS

| | | |
|---|---|---|
| 5,546,129 | 8/1996 | Lee . |
| 5,612,746 | 3/1997 | Slavin . |
| 5,682,204 * | 10/1997 | Uz et al. ........................ 375/240.15 |
| 5,696,848 * | 12/1997 | Patti et al. ........................ 382/254 |
| 5,761,398 * | 10/2000 | Legall ............................ 375/240.17 |
| 5,801,778 * | 9/1998 | Ju ................................... 375/240.15 |
| 6,128,341 * | 10/2000 | Kwak ................................ 375/240 |

* cited by examiner

Primary Examiner—Chris Kelley
Assistant Examiner—Gims Philippe
(74) Attorney, Agent, or Firm—Anderson Kill & Olick, PC

(57) ABSTRACT

In an apparatus for performing a motion estimation (ME) on a block (BL) within a current frame based on a predetermined reference frame (PRF), a difference block (DB) forming channel provides a DB representing a difference between the block and a corresponding reference BL. And a ME path deciding circuit provides a zero vector if AV≦TH1, AV being an activity value of the DB, provides the BL as a first BL if TH1<AV≦TH2 and divides the BL into sub BL's (SB's) if AV>TH2 and then provides the SB's as a set of second BL's (SBL's) if TH2<AV≦TH3 and the SB's as a set of third BL's (TBL's) if AV>TH3, wherein TH1, TH2 and TH3 are preset thresholds, respectively. A first ME circuit performs a ME on a sample BL obtained by subsampling the first BL within a first predetermined search region (PSR) in a sample reference frame by using a first block matching method (BMM) employing a predetermined full search technique (PFST) to generate a first MV. And a second ME circuit carries out a ME on each of the SBL's within a second PSR in the PRF by using a second BMM employing a predetermined logarithmic search technique to generate a set of second MV's corresponding to the SBL's. And a third ME circuit executes a ME on each of the TBL's within a third PSR in the PRF by using a third BMM employing the PFST to generate a set of third MV's corresponding to the TBL's.

20 Claims, 4 Drawing Sheets

ADAPTIVE MOTION ESTIMATION METHOD AND APPARATUS

FIELD OF THE INVENTION

The present invention relates to a motion estimation method and apparatus; and, more particularly, to an adaptive motion estimation method and apparatus.

DESCRIPTION OF THE PRIOR ART

In digital video systems such as video-telephone, teleconference and high definition television (HDTV) systems, a large amount of digital data is needed to define a video frame signal since a video line signal in the video frame signal comprises a sequence of digital data referred to as pixels.

Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference systems.

Among the various video compression techniques, a motion compensated inter-frame coding technique, which utilizes temporal redundancies of video signals between two adjacent video frames, is known to be one of the most effective compression techniques.

In the motion compensated inter-frame coding technique, current frame data is predicted from previous frame data based on an estimation of the motion and differences between corresponding pixel data in the current and the previous frames.

One of the motion vector estimation schemes which have been proposed in the art is a block matching algorithm or method, wherein a current frame is divided into a plurality of equal-sized search blocks, a typical size of each search block ranging between 8×8 and 32×32 pixels, and a previous frame is divided into a corresponding number of large search regions, each search region being further divided into a multiplicity of candidate blocks of an identical size with that of the search block.

To determine a motion vector for a search block in the current frame, a similarity calculation is performed between the search block of the current frame and each of the multiplicity of candidate blocks included in a corresponding search region within the previous frame.

An error function such as mean square error (MSE) function or mean absolute error (MAE) function is used to carry out the similarity calculation between the search block of the current frame and each of the candidate blocks in the corresponding search region.

The MSE and MAE functions can be expressed as follows:

$$MSE = \frac{1}{H \times V} \sum_{i=1}^{H} \sum_{j=1}^{V} (I(i, j) - P(i, j))^2,$$

$$MAE = \frac{1}{H \times V} \sum_{i=1}^{H} \sum_{j=1}^{V} |I(i, j) - P(i, j)|,$$

wherein H×V represents the size of a search block; I(i,j) represents the luminance level of a pixel at a coordinate (i,j) in the search block; and P(i,j) represents the luminance level of a corresponding pixel at the coordinate (i,j) in a candidate block.

And in the conventional block matching algorithm, a displacement vector between the search block and a best matching candidate block, i.e., a candidate block that minimizes the error function, is chosen as a motion vector (MV). It should be noted that such a technique used in obtaining the MV described above is usually called a full search technique.

The MV and an error signal which represents a difference between the search block and the best matching candidate block are then encoded and transmitted to a receiver. The encoded MV and the encoded error signal are used at the receiver to reconstruct the current frame based on its previous frame on a block-by-block basis.

Meanwhile, there is known a motion estimation (ME) apparatus for performing a ME on a block by using a block matching method employing one of various subsampling techniques to further reduce the amount of the encoded data and the processing time thereof.

For example, referring to FIG. 1, there is illustrated a block diagram of a conventional ME apparatus 100 for performing a ME on a block by using a block matching method employing a predetermined subsampling technique, wherein the apparatus 100 is the same ME apparatus as disclosed in a commonly owned co-pending application, U.S. Ser. No. 09/132,522, entitled "MOTION ESTIMATION METHOD AND APPARATUS EMPLOYING SUBSAMPLING TECHNIQUE".

The apparatus 100 comprises a block subsampling channel 110, a reference frame (RF) subsampling channel 115, a best matching candidate block detection circuit 120 and a motion vector generation circuit 122. The block subsampling channel 110 includes a block dividing circuit 102, a first decision circuit 104, a second decision circuit 106 and a sample block generation circuit 108.

In the apparatus 100, a block of N×M pixels within a current frame is inputted to the block dividing circuit 102 via a line L11 from a current frame memory (not shown), wherein N and M are predetermined positive integers, respectively. And a predetermined reference frame (PRF), e.g., a previous frame, is inputted to the RF subsampling circuit 115 via a line L12 from a RF memory (not shown). The block dividing circuit 102 divides the block into a plurality of subblocks (SB's) of K×L pixels and then classifies the SB's into A-group SB's and B-group SB's in accordance with the rule that all of the SB's in a same group be diagonally adjacent to each other, wherein K and L are predetermined positive integers which are dividers of N and M, respectively.

Thereafter, the block dividing circuit 102 provides the A-group SB's (ASB's) and the B-group SB's (BSB's) to the first decision circuit 104 and the second decision circuit 106 via lines L13 and L14, respectively.

The first decision circuit 104 decides a pixel that satisfies a first predetermined condition among the pixels in an ASB as an A-group representative pixel for the ASB. In this way, the first decision circuit 104 decides A-group representative pixels (ARP's) corresponding to all of the ASB's and then supplies the ARP's to the sample block generation circuit 108 through a line L15.

The second decision circuit 106 decides a pixel satisfies a second predetermined condition among the pixels in a BSB as a B-group representative pixel for the BSB, wherein the second predetermined condition is different from the first predetermined condition. Typically, the first predetermined condition is that the pixel has a maximum pixel value among the pixels and the second predetermined condition is that the pixel has a minimum pixel value among the pixels.

In this way, the second decision circuit 106 decides B-group representative pixels (BRP's) corresponding to all of the BSB's and then supplies the BRP's to the sample block generation circuit 108 through a line L16. The sample block generation circuit 108 combines the ARP's with the BRP's to thereby generate a sample block.

Meanwhile, the RF subsampling channel 115 performs a subsampling on the PRF in accordance with the same method as that used in generating the sample block by the block subsampling channel 110 to thereby generate a sample reference frame (SRF) on a line L18.

Thereafter, the best matching candidate block detection circuit 120, based on the sample block and the SRF, detects a CB having a smallest error value to the sample block among the CB's within a predetermined search region (PSR) in the SRF as a best matching CB by using a predetermined block matching method employing a full search technique and then provides the best matching CB to the motion vector generation circuit 122.

The motion vector generation circuit 122 generates a displacement between the sample block and the best matching CB as a motion vector (MV) corresponding to the sample block.

Further, among the conventional ME methods, there is known a block matching method employing a logarithmic search technique (see Moving Pictures Experts Group (MPEG), International Organization for Standardization, Coding of Moving Pictures and Associated Audio, ISO/IEC/JTC1/SC29, Mar. 26, 1992, 2-Annex D, pp D-32 to D-33).

FIGS. 2A and 2B show diagrams for explaining a conventional block matching method employing a logarithmic search technique, respectively. Referring to FIGS. 2A and 2B, the conventional logarithmic search method will be explained.

In the conventional block matching method employing the logarithmic search technique, 9 number of first grids (FG's), e.g., FG1 to FG9 as shown in FIG. 2A, are first examined, wherein the FG's include corresponding first candidate blocks (FCB's), e.g., FCB1 to FCB9 as depicted in FIG. 2A, respectively. It should be noted that the FG's represent rectangles of (F/3)×(G/3) pixels within a search region of F×G pixels in the PRF, F and G being predetermined positive integers which are multiples of 3, respectively. FIG. 2A depicts an exemplary search region 200 including 9 number of FG's, each FG having a corresponding FCB.

Among the 9 number of FG's, a FG having a best matching FCB to a search block is selected as a first selected grid. It should be noted that the center points of the FG's coincide with the center points of the corresponding FCB's, respectively.

Thereafter, the first selected grid is divided into a plurality of second grids (SG's) of H×J pixels, wherein H and J are predetermined positive integers which are dividers of (F/3) and (G/3), respectively. FIG. 2B depicts an exemplary first selected grid 210 having SG's SG1 to SG4. It should be noted that the SG's include corresponding second candidate blocks (SCB's), e.g., SCB1 to SCB4 as depicted in FIG. 2B, respectively.

And then, among the SG's, a SG having a best matching SCB to the search block is selected as a second selected grid. It should be noted that the center points of the SG's coincide with the center points of the corresponding SCB's, respectively.

Similarly, a multiple step logarithmic search process is executed. Among the multiple step logarithmic search techniques, a three step logarithmic search technique is widely used.

In the three step logarithmic search technique, among a plurality of third candidate blocks (TCB's) in the second selected grid, a TCB which has a minimum error function to the search block is determined by using a full search technique as a final best matching candidate block. As a result, a MV between the search block and the final best matching candidate block is obtained. It should be noted that the size of each of the FCB's, SCB's and TCB's is identical to that of the search block.

A block matching method employing only a full search technique achieves a high ME accuracy but entails substantial amounts of computational burden and calculation time, thereby rendering the real time processing thereof difficult.

A block matching method employing a logarithmic search technique decreases the calculation time but deteriorates the ME accuracy in the ME process.

And a block matching method employing a subsampling technique has an intermediate-level ME ability in view of the processing time and the ME accuracy thereof in comparison with a block matching method employing only a full search technique and a block matching method employing a logarithmic search technique. But the block matching method employing a subsampling technique has limitation both in increasing the ME accuracy and in decreasing the processing time of ME on a block within a frame.

Therefore, to achieve both a higher ME accuracy and a shorter processing time than the above-mentioned conventional block matching methods, it is necessary to introduce an adaptive or a hybrid block matching method employing a full search technique, a subsampling technique and a logarithmic search technique adaptively.

SUMMARY OF THE INVENTION

It is, therefore, a primary object of the present invention to provide an adaptive motion estimation method and apparatus capable of adaptively performing a motion estimation on a block in a current frame based on an evaluation of a difference between the block and a corresponding reference block in a predetermined reference frame.

In accordance with the present invention, there is provided an apparatus for performing a motion estimation on a block of N×M pixels within a current frame based on a predetermined reference frame, N and M being predetermined positive integers, respectively, the apparatus comprising: a circuit for providing a difference block of N×M pixels representing a difference between the block and a corresponding reference block (CRB) based on the block and the predetermined reference frame (PRF); a motion estimation (ME) path deciding circuit for providing a zero vector as a motion to vector (MV) for the block if AV≦TH1, AV being an activity value of the difference block, providing the block as a first block if TH1<AV≦TH2 and dividing the block into a plurality of subblocks of K×L pixels if AV>TH2, K and L being predetermined positive integers which are dividers of N and M, respectively, and then providing the subblocks as a set of second blocks of K×L pixels if TH2<AV≦TH3 and the subblocks as a set of third blocks of K×L pixels if AV>TH3 under the condition that TH1<TH2<TH3, wherein TH1, TH2 and TH 3 are a first predetermined threshold value (PTV), a second PTV and a third PTV, respectively; a first ME circuit for performing a ME on a sample block within a first predetermined search region (PSR) in a sample reference frame (SRF) by using a first block matching method employing a predetermined full search technique to generate a first MV and a first supplementary signal (SS) and then combining the first MV and the first SS to thereby provide a first ME data for the block, wherein the sample block and the SRF are obtained by subsampling the first blocks and the PRF, respectively, employing a predetermined subsampling technique and the first SS represents that the ME is performed on the sample block; a second ME circuit for carrying out a ME on each of the second blocks within a second PSR in the PRF by using a second block matching method employing a predetermined logarithmic search technique to generate a set of second MV's corresponding to the second blocks and a second SS and then combine the set of the second MV's and the second SS to thereby provide a second ME data for the block, wherein the second SS represents that the ME is carried out on said each of the second blocks; and a third ME circuit for executing a ME on each of the third blocks within a third PSR in the PRF by using a third block matching method employing a predetermined full search technique to generate a set of third MV's corresponding to the third blocks and a third SS and then combine the set of the third MV's and the third SS to thereby provide a third ME data for the block, wherein the third SS represents that the ME is executed on said each of the third blocks.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
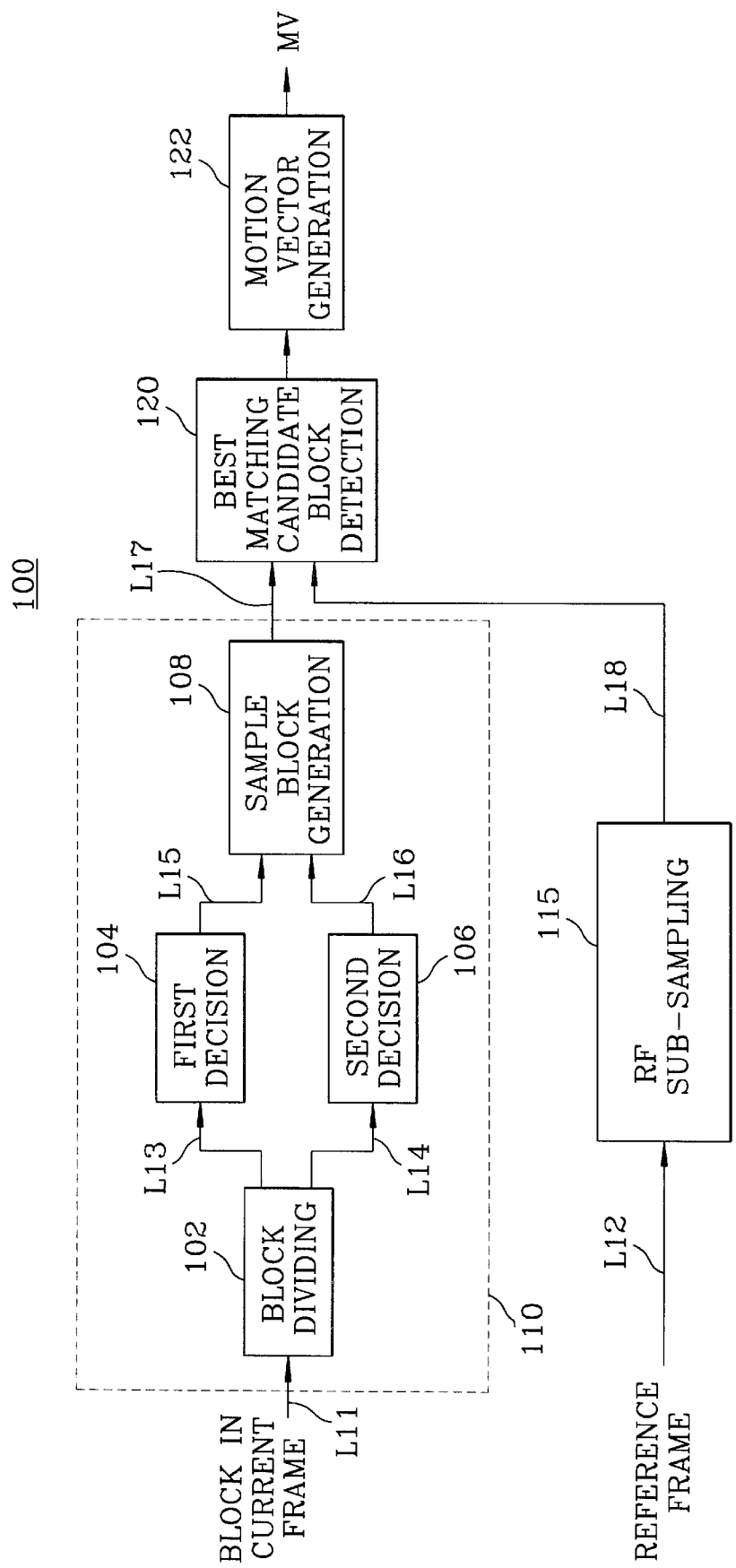
FIG. 1 illustrates a block diagram of a conventional motion estimation (ME) apparatus for performing ME on a block by using a block matching method employing a predetermined subsampling technique.
Figure 2A:
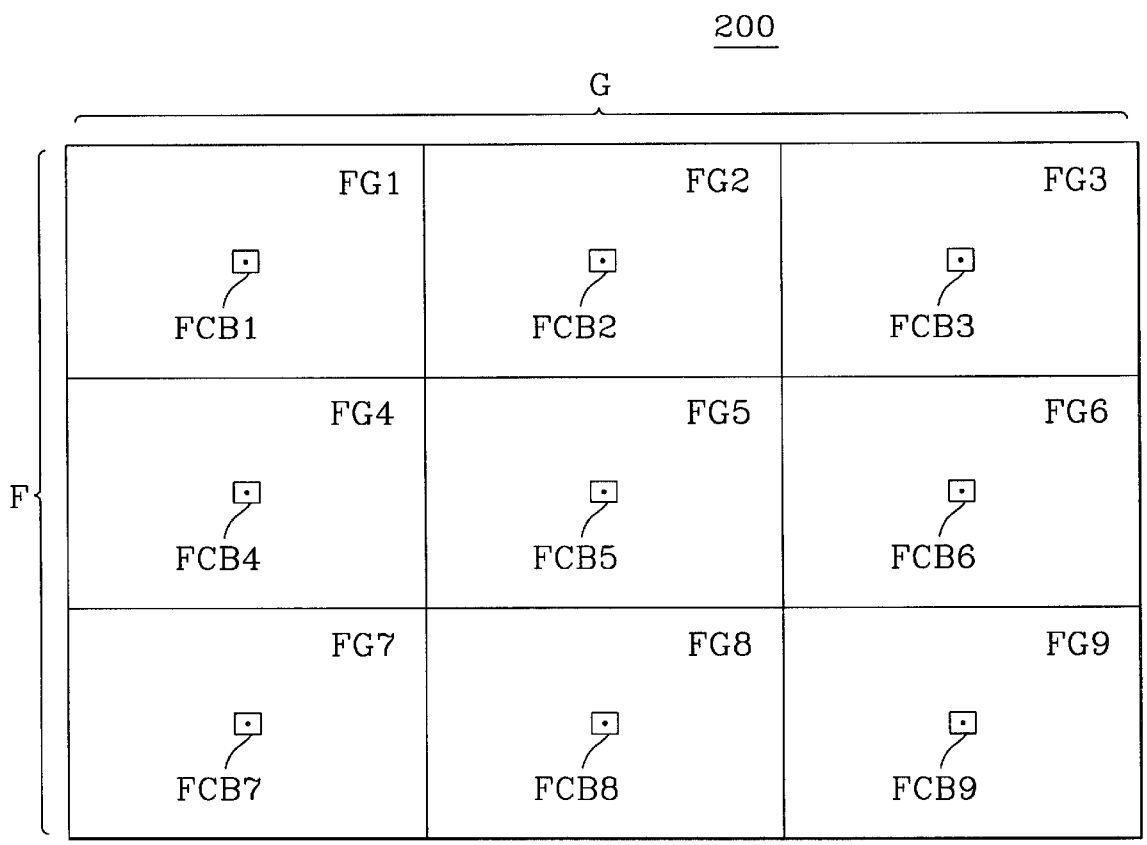
FIGS. 2A and 2B show diagrams for use in explaining a conventional block matching method employing a logarithmic search technique, respectively.
Figure 2B:
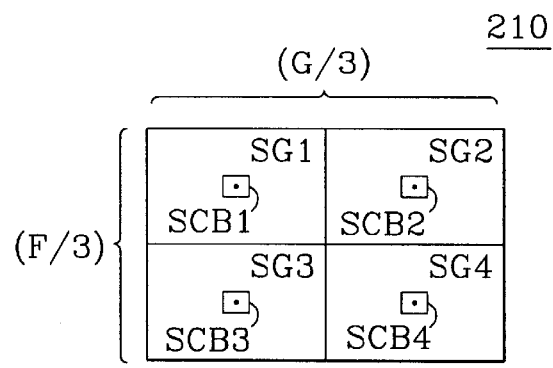
Figure 3:
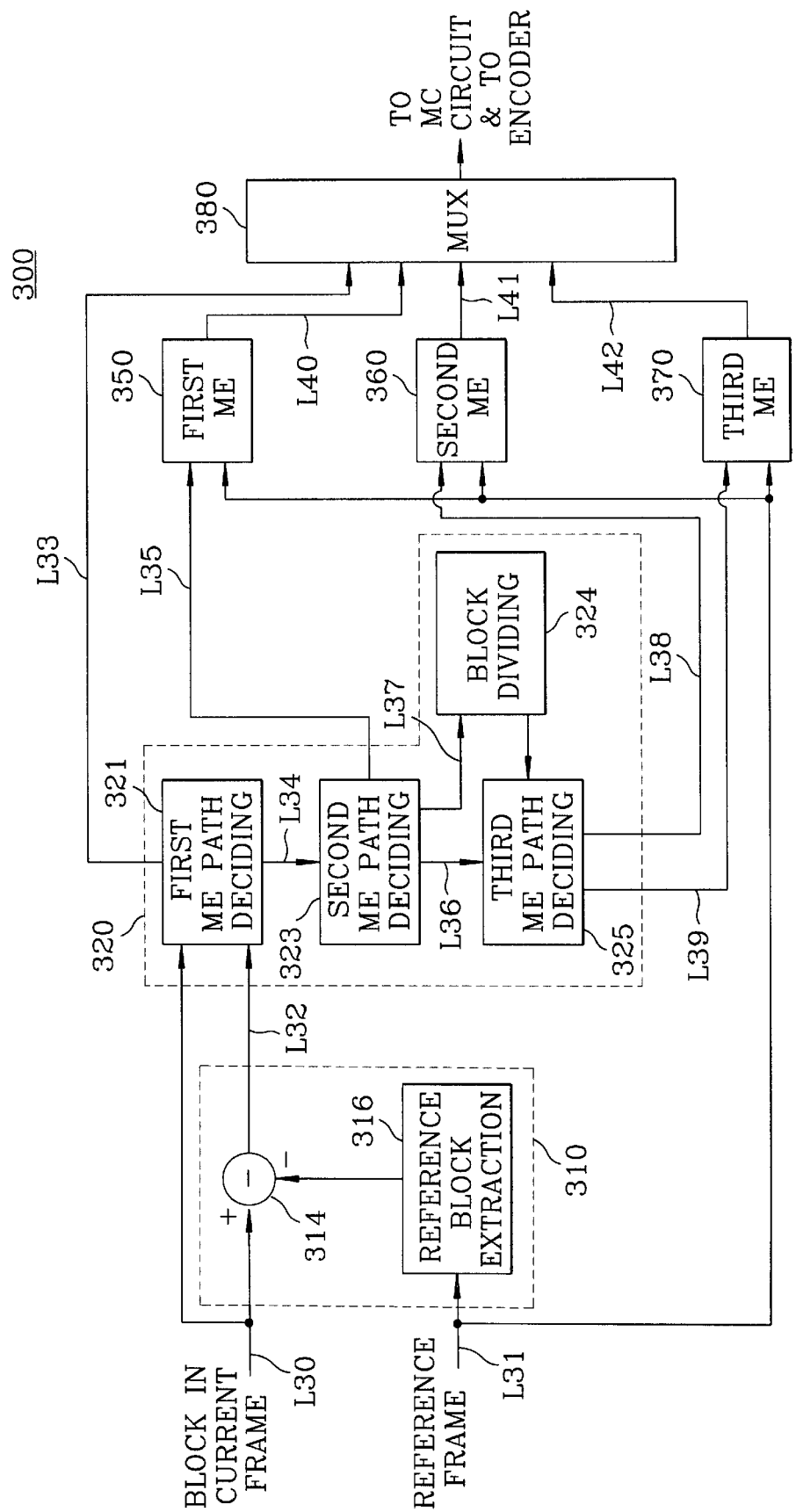
FIG. 3 represents a block diagram of an adaptive ME apparatus in accordance with the present invention.

Referring to FIG. 3, there is represented a block diagram of an adaptive motion estimation apparatus 300 in accordance with the present invention. The apparatus 300 comprises a difference block forming channel 310, a motion estimation (ME) path deciding channel 320, a first ME circuit 350, a second ME circuit 360, a third ME circuit 370 and a multiplexer (MUX) 380.

The difference block forming channel 310 includes a subtractor 314 and a reference block extraction circuit 316. The ME path deciding channel 320 includes a first ME path deciding circuit 321, a second ME path deciding circuit 323, a block dividing circuit 324 and a third ME path deciding circuit 325.

In the apparatus 300, a block of N×M pixels within a current frame is first fed to the subtractor 314 and the first ME path deciding circuit 321 through a line L30 from a current frame memory (not shown), wherein N and M are predetermined positive integers, respectively.

And a predetermined reference frame (PRF) is inputted to the reference block extraction circuit 316, the first ME circuit 350, the second ME circuit 360 and the third ME circuit 370 via a line L31 from a reference frame memory (not shown). It should be noted that the PRF is typically a previous frame reconstructed by using a predetermined reconstruction method.

The difference block forming channel 310 provides a difference block of N×M pixels representing a difference between the block and a corresponding reference block (CRB) based on the block and the PRF.

In detail, in the difference block forming channel 310, the reference block extraction circuit 316 first extracts a reference block within the PRF located at an identical position to that of the block within the current frame as the CRB to thereby provide the CRB to the subtractor 314. And then, the subtractor 314 subtracts the CRB from the block to thereby provide the difference block to the first ME path deciding circuit 321 via a line L32.

The ME path deciding channel 320 provides a zero vector as a motion vector (MV) for the block to the MUX 380 through a line L33 if AV≦TH1, wherein AV is an activity value of the difference block; provides the block as a first block to the first ME circuit 350 via a line L35 if TH1<AV≦TH2; and divides the block into a plurality of sub blocks of K×L pixels if AV>TH2, K and L being predetermined positive integers which are dividers of N and M, respectively under the condition that TH1<TH2<TH3, wherein TH1, TH2 and TH3 are a first predetermined threshold value (PTV) a second PTV and a third PTV, respectively.

It should be noted that in accordance with a preferred embodiment of the present invention, the AV is either mean square error or mean absolute error of values of pixels in the difference block.

And then the ME path deciding channel 320 provides the subblocks as a set of second blocks of K×L pixels to the second ME circuit 360 through a line L38 if TH2<AV≦TH3 and the subblocks as a set of third blocks of K×L pixels to the third ME circuit 370 via a line L39 if AV>TH3 under the condition that TH2<TH3. In accordance with a preferred embodiment of the present invention, N and K are equal to M and L, respectively. For example, N and K are typically 16 and 4, respectively.

In detail, in the ME path deciding channel 320, the first ME path deciding circuit 321 first calculates the AV and then provides the zero vector as the MV for the block to the MUX 380 through the line L33 if AV≦TH1; and provides the AV and the block to the second ME path deciding circuit 323 via a line L34 if AV>TH1.

The second ME path deciding circuit 323 supplies the block inputted thereto from the first ME path deciding circuit 321 as the first block through the line L35 to the first ME circuit 350 if TH1<AV≦TH2 and supplies the AV and the block to the third ME path deciding circuit 325 via a line L36 and the block to the block dividing circuit 324 via a line L37 if the AV>TH2.

The block dividing circuit 324 divides the block fed thereto from the second ME path deciding circuit 323 via the line L37 into a plurality of subblocks of K×L pixels and then provides the subblocks to the third ME path deciding circuit 325.

The third ME path deciding circuit 325 provides the subblocks fed thereto from the block dividing circuit 324 as a set of second blocks of K×L pixels to the second ME circuit 360 through the line L38 if TH2<AV≦TH3 and provides the subblocks as a set of third blocks of K×L pixels to the third ME circuit 370 via the line L39 if AV>TH3.

The first ME circuit 350 performs a ME on a sample block within a first predetermined search region (PSR) in a sample reference frame (SRF) by using a first block matching method employing a predetermined full search technique to generate a first MV and a first supplementary signal (SS), wherein the sample block and the SRF are obtained by subsampling the first block and the PRF, respectively, employing a predetermined subsampling technique and the first SS represents that the ME is performed on the sample block.

Figure 4A:
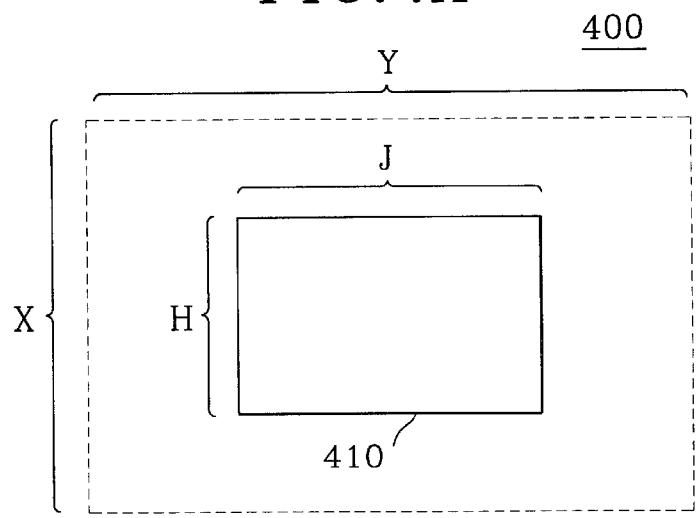
FIGS. 4A to 4C depict search regions for use in describing a motion estimation method in accordance with a preferred embodiment of the present invention.

In accordance with a preferred embodiment of the present invention, the sizes of the sample block and the first PSR are H×J pixels and X×Y pixels, respectively; X and Y being predetermined positive integers greater than predetermined positive integers H and J, respectively. For example, referring to FIG. 4A, there is depicted a first PSR 400 of X×Y pixels and a sample block 410 of H×J pixels.

And then the first ME circuit 350 combines the first MV and the first SS to thereby generate and in turn provide a fist ME data for the block to the MUX 380 via a line L40.

The second ME circuit 360 carries out a ME on each of the second blocks within a second PSR in the PRF by using a second block matching method employing a predetermined logarithmic search technique to generate a set of second MV's corresponding to the second blocks and a second SS and then combines the set of the second MV's and the second SS to thereby provide a second ME data for the block to the MUX 380 via a line L41, wherein the second SS represents that the ME is carried out on each of the second blocks.

Figure 4B:
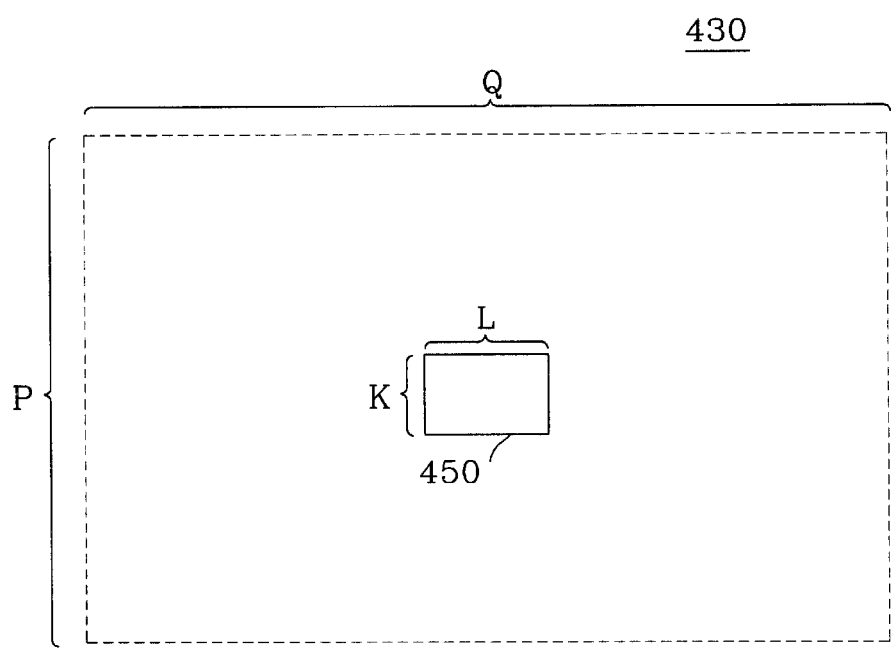

In accordance with a preferred embodiment of the present invention, the predetermined logarithmic search technique is a three step logarithmic search technique; and the size of the second PSR is P×Q pixels, P and Q being multiples of 3's, respectively. And in accordance with a preferred embodiment of the present invention, P and Q are predetermined positive integers greater than N and M, respectively. For example, referring to FIG. 4B, there is depicted a second PSR 430 of P×Q pixels and a second block 450 of K×L pixels.

The third ME circuit 370 executes a ME on each of the third blocks within a third PSR in the PRF by using a third block matching method employing a predetermined full search technique to generate a set of third MV's corresponding to the third blocks and a third SS and then combines the set of the third MV's and the third SS to thereby provide a third ME data for the block to the MUX 380 through a line L42, wherein the third SS represents that the ME is executed on each of the third blocks.

Figure 4C:
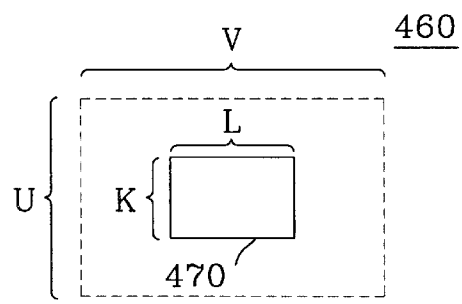

In accordance with a preferred embodiment of the present invention, the size of the third PSR is U×V pixels, U and V being predetermined positive integers greater than K and L, respectively. For example, referring to FIG. 4C, there is depicted a third PSR 460 of U×V pixels and a third block 470 of K×L pixels.

The MUX 380 mutilplexes the zero vector for the block from the first ME path deciding circuit 320, the first ME data from the first ME circuit 350, the second ME data from the second ME circuit 360 and the third ME data from the third ME circuit 370 to thereby provide a multiplexed data as a ME data to a motion compensation (MC) circuit (not shown) for the MC thereof and to an encoder (not shown) for the encoding thereof.

Therefore, in accordance with the present invention, it is possible to provide an adaptive motion estimation method and apparatus capable of adaptively performing a ME on a block in a current frame based on the evaluation of the difference between the block and a CRB in a PRF to thereby provide the enhanced ME efficiency thereof.

While the present invention has been described with respect to certain preferred embodiments only, other modifications and variations may be made without departing from the spirit and scope of the present invention as set forth in the following claims.

What is claimed is:

1. An apparatus for performing a motion estimation on a block of N×M pixels within a current frame based on a predetermined reference frame, N and M being predetermined positive integers, respectively, the apparatus comprising:

means for providing a difference block of N×M pixels representing a difference between the block and a corresponding reference block (CRB) based on the block and the predetermined reference frame (PRF);

motion estimation (ME) path deciding means for providing a zero vector as a motion vector (MV) for the block if AV≦TH1, AV being an activity value of the difference block, providing the block as a first block if TH1<AV≦TH2 and dividing the block into a plurality of subblocks of K×L pixels if AV>TH2, K and L being predetermined positive integers which are dividers of N and M, respectively, and then providing the subblocks as a set of second blocks of K×L pixels if TH2<AV≦TH3 and the subblocks as a set of third blocks of K×L pixels if AV>TH3 under the condition that TH1<TH2<TH3, wherein TH1, TH2 and TH3 are a first predetermined threshold value (PTV), a second PTV and a third PTV, respectively;

first ME means for performing a ME on a sample block within a first predetermined search region (PSR) in a sample reference frame (SRF) by using a first block matching method employing a predetermined full search technique to generate a first MV and a first supplementary signal (SS) and then combining the first MV and the first SS to thereby provide a first ME data for the block, wherein the sample block and the SRF are obtained by subsampling the first blocks and the PRF, respectively, employing a predetermined subsampling technique and the first SS represents that the ME is performed on the sample block;

second ME means for carrying out a ME on each of the second blocks within a second PSR in the PRF by using a second block matching method employing a predetermined logarithmic search technique to generate a set of second MV's corresponding to the second blocks and a second SS and then combine the set of the second MV's and the second SS to thereby provide a second ME data for the block, wherein the second SS represents that the ME is carried out on said each of the second blocks; and third ME means for executing a ME on each of the third blocks within a third PSR in the PRF by using a third block matching method employing a predetermined full search technique to generate a set of third MV's corresponding to the third blocks and a third SS and then combine the set of the third MV's and the third SS to thereby provide a third ME data for the block, wherein the third SS represents that the ME is executed on said each of the third blocks.

2. The apparatus according to claim 1, wherein said difference block providing means includes:

reference block extraction means for extracting a reference block within the PRF located at an identical position to that of the block within the current frame as the CRB; and subtracting means to subtract the CRB from the block to thereby provide the difference block.

3. The apparatus according to claim 2, wherein said ME path deciding means includes:

first ME path deciding means for calculating the AV and then providing the zero vector as the MV for the block if AV≦TH1 and providing the AV and the block if AV>TH1;

second ME path deciding means for supplying the block as the first block if TH1<AV≦TH2 and supplying the AV and the block if AV>TH2;

block dividing means for dividing the block fed thereto from said ME path deciding means into a plurality of the subblocks of K×L pixels; and third ME path deciding means for providing the subblocks as the set of second blocks of K×L pixels if TH2<AV≦TH3 and the subblocks as the set of third blocks of K×L pixels if AV>TH3.

4. The apparatus according to claim 1, wherein N and K are equal to M and L, respectively.

5. The apparatus according to claim 4, wherein N and K are 16 and 4, respectively.

6. The apparatus according to claim 1, wherein the AV is either mean square error or mean absolute error of values of pixels in the difference block.

7. The apparatus according to claim 1, wherein the sizes of said sample block and said first PSR are H×J pixels and X×Y pixels, respectively; X and Y being predetermined positive integers greater than predetermined positive integers H and J, respectively.

8. The apparatus according to claim 1, wherein said predetermined logarithmic search technique is a three step logarithmic search technique; and the size of said second PSR is P×Q pixels, P and Q being multiples of 3's, respectively.

9. The apparatus according to claim 8, wherein P and Q are predetermined positive integers greater than N and M, respectively.

10. The apparatus according to claim 1, wherein the size of said third PSR is U×V pixels, U and V being predetermined positive integers greater than K and L, respectively.

11. A method for performing a motion estimation on a block of N×M pixels within a current frame based on a predetermined reference frame, N and M being predetermined positive integers, respectively, the method comprising the steps of:

(a) providing a difference block of N×M pixels representing a difference between the block and a corresponding reference block (CRB) based on the block and the predetermined reference frame (PRF);

(b) motion estimation (ME) path deciding providing a zero vector as a motion vector (MV) for the block if AV≦TH1, AV being an activity value of the difference block, providing the block as a first block if TH1<AV≦TH2 and dividing the block into a plurality of subblocks of K×L pixels if is removed) AV>TH2, K and L being predetermined positive integers which are dividers of N and M, respectively, and then providing the subblocks as a set of second blocks of K×L pixels if TH2<AV≦TH3 and the subblocks as a set of third blocks of K×L pixels if AV>TH3 under the condition that TH1<TH2<TH3, wherein TH1, TH2 and TH3 are a first predetermined threshold value (PTV), a second PTV and a third PTV, respectively;

(c) performing a ME on a sample block within a first predetermined search region (PSR) in a sample reference frame (SRF) by using a first block matching method employing a predetermined full search technique to generate a first MV and a first supplementary signal (SS) and then combining the first MV and the first SS to thereby provide a first ME data for the block, wherein the sample block and the SRF are obtained by subsampling the first blocks and the PRF, respectively, employing a predetermined subsampling technique and the first SS represents that the ME is performed on the sample block;

(d) carrying out a ME on each of the second blocks within a second PSR in the PRF by using a second block matching method employing a predetermined logarithmic search technique to generate a set of second MV's corresponding to the second blocks and a second SS and then combine the set of the second MV's and the second SS to thereby provide a second ME data for the block, wherein the second SS represents that the ME is carried out on said each of the second blocks; and (e) executing a ME on each of the third blocks within a third PSR in the PRF by using a third block matching method employing a predetermined full search technique to generate a set of third MV's corresponding to the third blocks and a third SS and then combine the set of the third MV's and the third SS to thereby provide a third ME data for the block, wherein the third SS represents that the ME is executed on said each of the third blocks.

12. The method according to claim 11, wherein said step (a) includes the steps of:

(a1) extracting a reference block within the PRF located at an identical position to that of the block within the current frame as the CRB; and (a2) subtracting the CRB from the block to thereby provide the difference block.

13. The method according to claim 12, wherein said step (b) includes the steps of:

(b1) calculating the AV and then providing the zero vector as the MV for the block if AV≦TH1 and providing the AV and the block if AV>TH1;

(b2) supplying the block as the first block if TH1<AV≦TH2 and supplying the AV and the block if AV>TH2;

(b3) dividing the block into a plurality of the subblocks of K×L pixels; and (b4) providing the subblocks as the set of second blocks of K×L pixels if TH2<AV≦TH3 and the subblocks as the set of third blocks of K×L pixels if AV>TH3.

14. The method according to claim 11, wherein N and K are equal to M and L, respectively.

15. The method according to claim 14, wherein N and K are 16 and 4, respectively.

16. The method according to claim 11, wherein the AV is either mean square error or mean absolute error of values of pixels in the difference block.

17. The method according to claim 11, wherein the sizes of said sample block and said first PSR are H×J pixels and X×Y pixels, respectively; X and Y being predetermined positive integers greater than predetermined positive integers H and J, respectively.

18. The method according to claim 17, wherein said predetermined logarithmic search technique is a three step logarithmic search technique; and the size of said second PSR is P×Q pixels, P and Q being multiples of 3's, respectively.

19. The method according to claim 18, wherein P and Q are predetermined positive integers greater than N and M, respectively.

20. The method according to claim 11, wherein the size of said third PSR is U×V pixels, U and V being predetermined positive integers greater than K and L, respectively.

* * * * *